(12) United States Patent
Kurose

(10) Patent No.: US 7,756,894 B2
(45) Date of Patent: Jul. 13, 2010

(54) USE OF KEYWORD OR ACCESS LOG INFORMATION TO ASSIST A USER WITH INFORMATION SEARCH AND RETRIEVAL

(75) Inventor: Hiroyasu Kurose, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 160 days.

(21) Appl. No.: 11/513,245

(22) Filed: Aug. 31, 2006

(65) Prior Publication Data
US 2007/0061311 A1    Mar. 15, 2007

(30) Foreign Application Priority Data
Sep. 1, 2005    (JP) .............................. 2005-254204

(51) Int. Cl.
G06F 17/30    (2006.01)
(52) U.S. Cl. ....................... 707/781; 707/609
(58) Field of Classification Search ............... 707/3, 707/8, 781, 9, 609; 715/753; 713/178
See application file for complete search history.

(56) References Cited

U.S. PATENT DOCUMENTS

| 2004/0122696 | A1* | 6/2004 | Beringer | ........................ | 705/1 |
| 2006/0184529 | A1* | 8/2006 | Berg et al. | ...................... | 707/8 |
| 2007/0288852 | A1* | 12/2007 | Fish | ............................ | 715/753 |
| 2008/0307232 | A1* | 12/2008 | Pasquinelli | ................. | 713/178 |

FOREIGN PATENT DOCUMENTS

| JP | 2003-132066 | 5/2003 |
| JP | 2003-337819 | 11/2003 |
| JP | 2004-110664 | 4/2004 |

OTHER PUBLICATIONS

Selma Elsheikh, access Control Scheme for web services (ACSWS), May 13-15, 2008, IEEE, pp. 854-858.*
Qiong Luo, Jeffrey F. Naughton, Wenwei Xue, Form-based proxy caching for database-backed web sites: keywords and functions, Aug. 19, 2006, ACM, pp. 1-25.*
Enric Mor, Muriel Garreta-Domingo, Julia Minguillon, Sheena Lewis, A three-level approach for analyzing user behavior in ongoing relationships, 2007, google.com, pp. 971-980.*

* cited by examiner

Primary Examiner—Mohammad Ali
Assistant Examiner—Donald Lawson
(74) Attorney, Agent, or Firm—Dickstein Shapiro LLP

(57) ABSTRACT

An apparatus, method, system, computer program and product, each capable of assisting a current user for information search or retrieval. Upon receiving keyword information from the user, a previous user who has accessed an inaccessible document having the keyword information or who has used the keyword information may be searched.

14 Claims, 10 Drawing Sheets

USE OF KEYWORD OR ACCESS LOG INFORMATION TO ASSIST A USER WITH INFORMATION SEARCH AND RETRIEVAL

CROSS-REFERENCE TO RELATED APPLICATIONS

This patent application is based on and claims priority to Japanese patent application No. 2005-254204 filed on Sep. 1, 2005, in the Japanese Patent Office, the entire contents of which are hereby incorporated by reference.

FIELD OF THE INVENTION

The following disclosure relates generally to an apparatus, method, system, computer program and product, each capable of assisting a user for information search or retrieval.

DESCRIPTION OF THE RELATED ART

Due to the increased security awareness, a today's information management system allows a user to only access information that the user has the right to access, for example, as illustrated in the Japanese Patent Application Publication No. 2004-110664 or the Japanese Patent Application Publication No. 2003-337819.

However, such information management system becomes effective only when the user's access right is maintained in a timely manner for each data. When the user's access right is not maintained, the user may not be able to access, in a timely manner, the data that the user is supposed to have the right to access. Further, the user may not be able to know that such data exists.

The Japanese Patent Application Publication No. 2003-132066 describes a document retrieval system, which provides a user with information regarding a document that the user does not have the right to access, such as the location information of the document. However, providing information regarding such document that the user does not have the right to access may weaken the security of the information management system.

BRIEF SUMMARY OF THE INVENTION

In light of the above, there is a need for an information management system capable of assisting the user for search or retrieval, even when the user does not have the right to access all data managed by the information management system, while keeping the security level of the system relatively high.

An example embodiment of the present invention includes an apparatus, method, system, computer program and product, each capable of searching a user who has accessed a document, having the keyword information, that is inaccessible from a current user. For example, a user search apparatus searches an inaccessible matched document using keyword information input by the current user and user information of the current user. When the inaccessible matched document is found, the user search apparatus further searches a previous user who has accessed the inaccessible matched document using access log information.

Another example embodiment of the present invention includes an apparatus, method, system, computer program and product, each capable of searching a user who has used keyword information input by a current user. For example, a user search apparatus searches a previous user who has used keyword information input by the current user using keyword log information.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
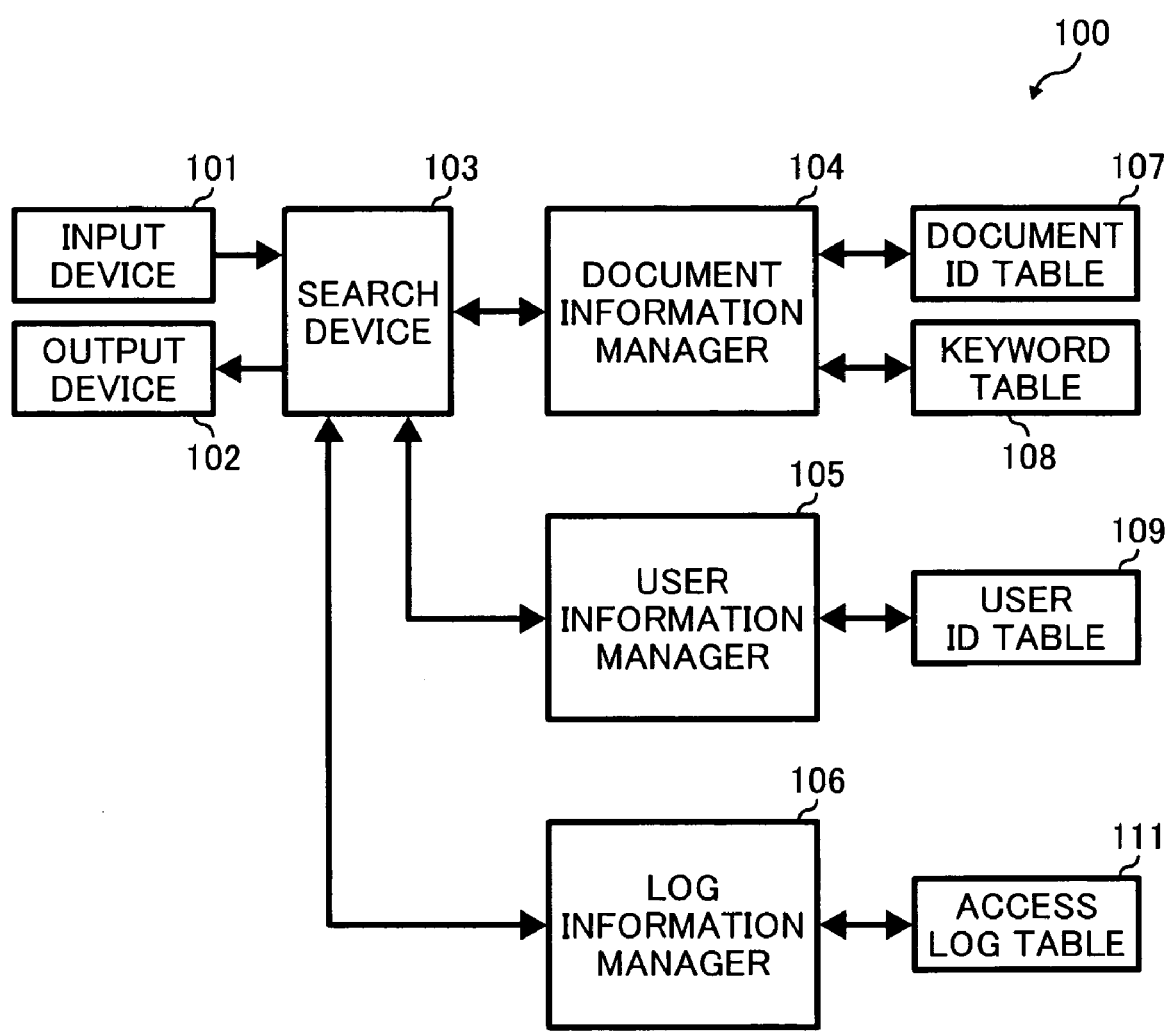
FIG. 1 is a schematic block diagram illustrating the functional structure of a user search apparatus according to an example embodiment of the present invention.

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates a user search apparatus according to an example embodiment of the present invention.

Figure 10:
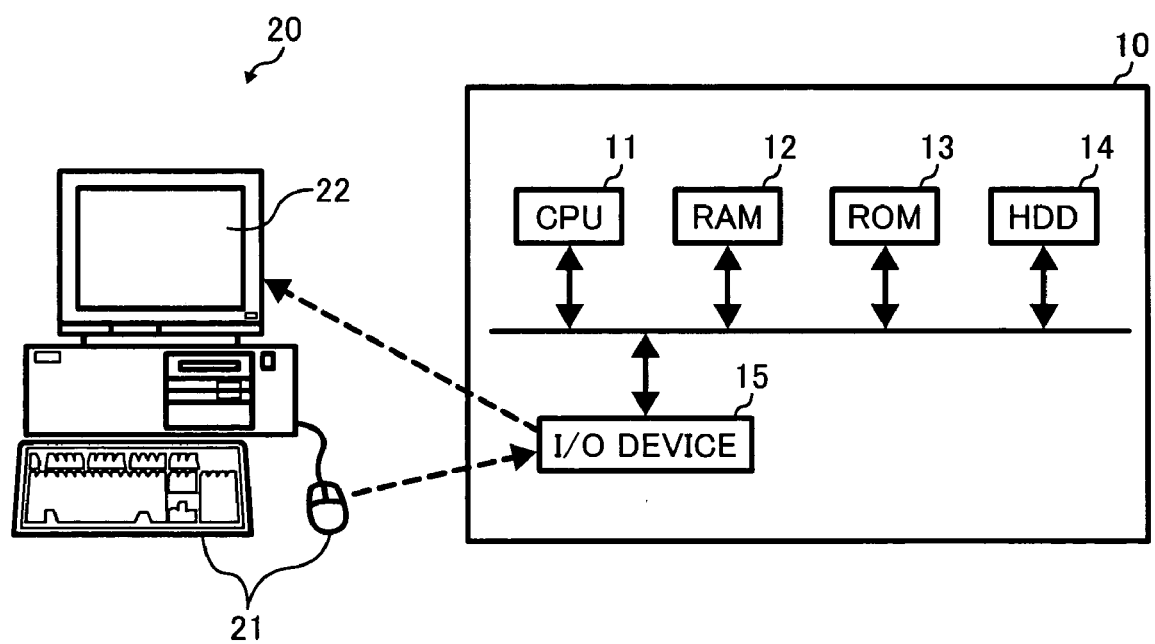
FIG. 10 is a schematic block diagram illustrating the hardware structure of a use search system according to an example embodiment of the present invention.

The user search apparatus 100 of FIG. 1 may be implemented by any kind of information processing apparatus, such as an information processing apparatus 10 illustrated in FIG. 10. Referring to FIG. 10, the information processing apparatus 10 functions as a server apparatus, which communicates with a client apparatus 20 via a network, such as a local area network (LAN) or the Internet. In this example, the information processing apparatus 10 is caused to function as the user search apparatus 100 of FIG. 1 upon a request sent from a current user at the client apparatus 20.

Referring back to FIG. 1, the user search apparatus 100 includes an input device 101, an output device 102, a search device 103, a document information manager 104, a user information manager 105, and a log information manager 106.

The input device 101 inputs various kinds of information input by the current user through, for example, a text input device such as a keyboard, or a pointing device such as a mouse of the client apparatus 20. The search device 103 searches through one or more databases that are managed by any one of the document information manager 104, the user information manager 105, and the log information manager 106, to obtain information regarding one or more previous users who have used the user search apparatus 100 in a manner that corresponds to the information input by the input device 101. The output device 102 outputs the information regarding one or more previous users obtained by the search device 103.

The document information manager 104 manages document information regarding a plurality of documents stored in or accessible from the user search apparatus 100. In one example, the document information manager 104 assigns an arbitrary number to each document every time the document is registered, and stores the uniquely assigned number in a document identification (ID) table 107 as document ID information. Alternatively, the stored location of the document such as the URL address of the document, or any portion of the URL address such as the title of the document or the folder of the document may be used as the document ID information. The document information manager 104 may additionally store other types of document information in the document ID table 107 including, for example, attribute information such as the date when the document is generated, the name of the author, or the confidentiality level assigned to the document. Further, the document information manager 104 stores one or more keywords, which are extracted from the contents of the registered document, in a keyword table 108 as keyword information of the document in a corresponding manner with the document ID information.

The user information manager 105 manages user information regarding a plurality of users who are authorized to use the user search apparatus 100. In one example, the user information manager 105 assigns a user ID to each authorized user every time the user is registered, and stores the user ID in a user ID table 109 as user ID information. At this time, the user information manager 105 additionally stores other types of user information regarding the user in the user ID table 109 including, for example, user name information indicating the name of the user, the password for allowing the user to log in, or access level information of the user. In this example, the access level information indicates the higher or lowest confidentiality level of the document that the user has the right to access. For example, if the user search apparatus 100 is integrated in a company's document system, the access level information may be previously determined depending on the position of the user in the company. If the user is in the higher position, the user may be able to have the right to access the document assigned with the high confidentiality level.

The log information manager 106 manages log information, which indicates one or more activities performed by one of the registered users, who has previously used the user search apparatus 100. In one example, the log information manager 106 stores access log information, which indicates one or more documents accessed by the previous user, in an access log table 111. The access log information may be stored as a data set including the document ID information of the accessed document and the user ID information of the previous user accessing the document, every time the previous user has accessed the document. The access log information may additionally include other types of information related to the user's operation of accessing, such as the date of access.

Any one of the tables managed by the user search apparatus 100 of FIG. 1 may be stored, for example, in one or more memory spaces of the user search apparatus 100. Alternatively, any one of the tables managed by the user search apparatus 100 of FIG. 1 may be stored, for example, in one or more memory spaces outside of the user search apparatus 100. In addition to the above-described tables, the user search apparatus 100 of FIG. 1 may store another table, such as a table for managing the registered documents.

Figure 2:
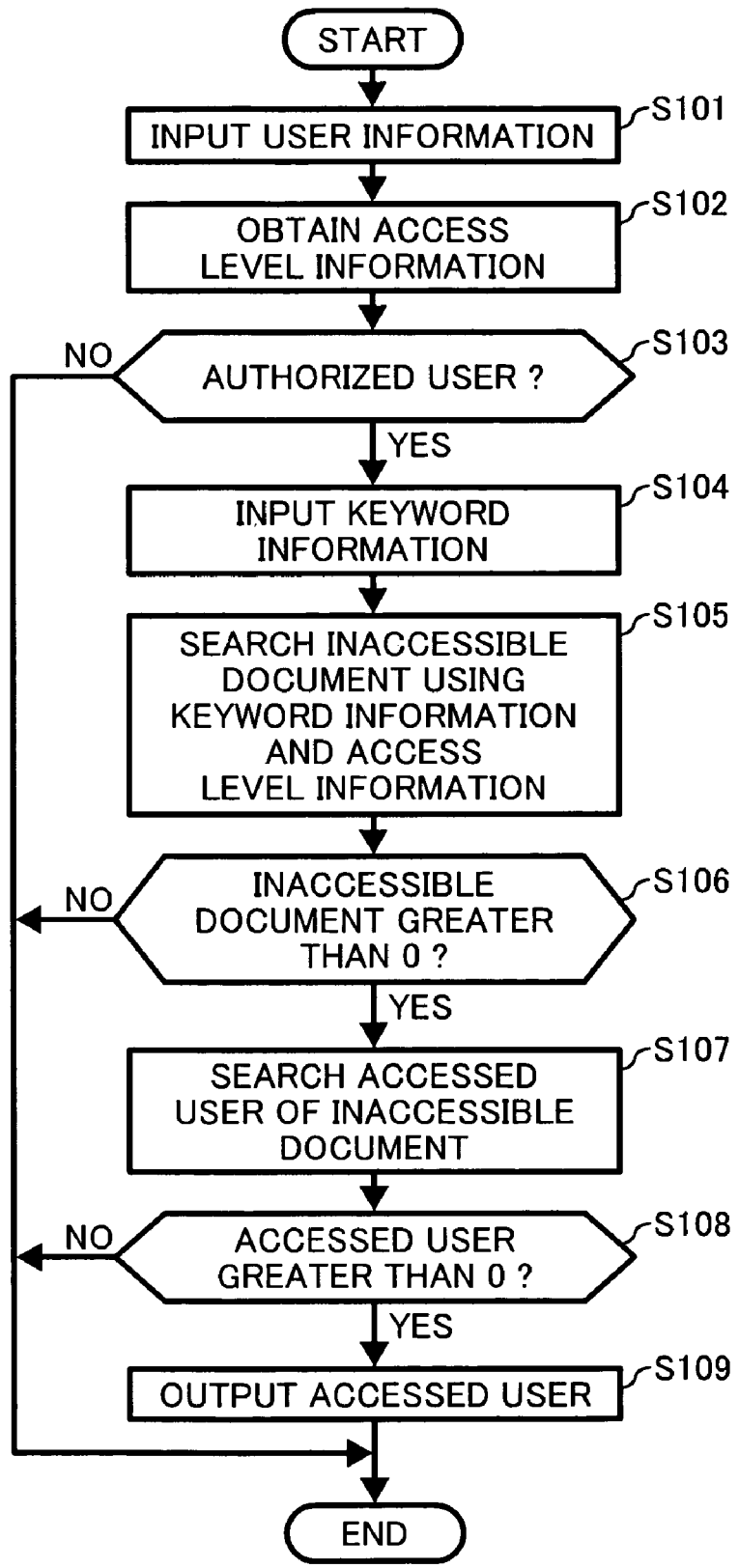
FIG. 2 is a flowchart illustrating operation of searching a previous user who has accessed a matched document that is inaccessible from a current user, according to an example embodiment of the present invention.

Referring now to FIG. 2, an example operation of searching a previous user who has accessed a matched document that is inaccessible from a current user, performed by the user search apparatus 100, is explained.

Step S101 inputs user information input by the current user at the client apparatus 20, such as the user ID information and the password of the current user.

Step S102 obtains access level information that corresponds to the user ID information input at Step S101, by searching through the user ID table 109 of FIG. 1.

Step S103 determines whether the current user is authorized to conduct the search, for example, by checking the password input at Step S101. If the current user is authorized ("YES" at Step S103), the operation proceeds to Step S104. Otherwise ("NO" at Step S103), the operation ends. When ending, the user search apparatus 100 may output an error message using the output device 102 to be displayed by the client apparatus 20.

Step S104 inputs keyword information input by the current user at the client apparatus 20. The keyword information may be input as one or more keywords or a sentence. When the sentence is input, one or more keywords are extracted from the sentence to be compared with the keyword information stored in the keyword table 108. Alternatively, the keyword information may be selected when one or more keywords are displayed by the client apparatus 20.

Step S105 searches for one or more inaccessible matched documents using the keyword information input by the current user and the access level information of the current user. In this example, the search device 103 obtains the document ID information of the inaccessible matched documents.

In one example, the search device 103 obtains the document ID information of one or more documents each having the keyword information, using the keyword table 108. The search device 103 extracts, from the matched documents, one or more inaccessible documents each having the confidentiality level higher than the confidentiality level indicated by the access level information of the current user, using the document ID table 107.

In another example, the search device 103 obtains the document ID information of one or more inaccessible documents each having the confidentiality level higher than the confidentiality level indicated by the access level information of the current user, using the document ID table 107. The search device 103 extracts, from the inaccessible documents, one or more matched documents each having the keyword information input by the current user, using the keyword table 108.

Step S106 determines whether the number of the inaccessible matched documents obtained at Step S105 is greater than 0. If the number of inaccessible matched documents is greater than 0 ("YES" at Step S106), the operation proceeds to Step S107. Otherwise ("NO" at Step S106), the operation ends. When ending, the user search apparatus 100 may output an error message using the output device 102 to be displayed by the client apparatus 20.

Step S107 searches for one or more previous users who have accessed at least one of the inaccessible matched documents using the access log table 111. In this example, the search device 103 obtains user information of the previous users, for example, the names of the previous users.

Step S108 determines whether the number of previous users obtained at Step S107 is greater than 0. If the number of previous users is greater than 0 ("YES" at Step S108), the operation proceeds to Step S109. Otherwise ("NO" at Step S108), the operation ends. When ending, the user search apparatus 100 may output an error message using the output device 102 to be displayed by the client apparatus 20.

Step S109 outputs user information regarding one or more previous users obtained at Step S108, and the operation ends. For example, the user information of the previous user, such as the names of the previous users, may be output for display at the client apparatus 20.

Once the user information of the previous users is obtained, the current user may be able to obtain information regarding one or more inaccessible matched documents, for example, by contacting one or more previous users.

The operation of FIG. 2 may be performed in various other ways. For example, the steps illustrated in FIG. 2 may not be performed in the order as described above. In another example, Step S103 may not be performed depending on how the system is set. In another example, in addition to outputting the user information of the previous user, the operation of FIG. 2 may include the step of notifying the previous user that the current user is in need of acquiring information regarding the inaccessible matched document.

In another example, after the matched documents having the keyword information are extracted at Step S105, the accessible matched documents each having the confidentiality level equal to or lower than the access level information of the current user may be identified. Once identified, the accessible matched documents may be output for display along or together with the inaccessible matched documents. For example, at least one of the accessible matched documents may be output as a link, which allows the current user to access the actual document. When the current user accesses the document, the log information manager 106 updates the access log information, for example, by storing the user ID information of the current user and the document ID information of the accessed document.

Figure 3:
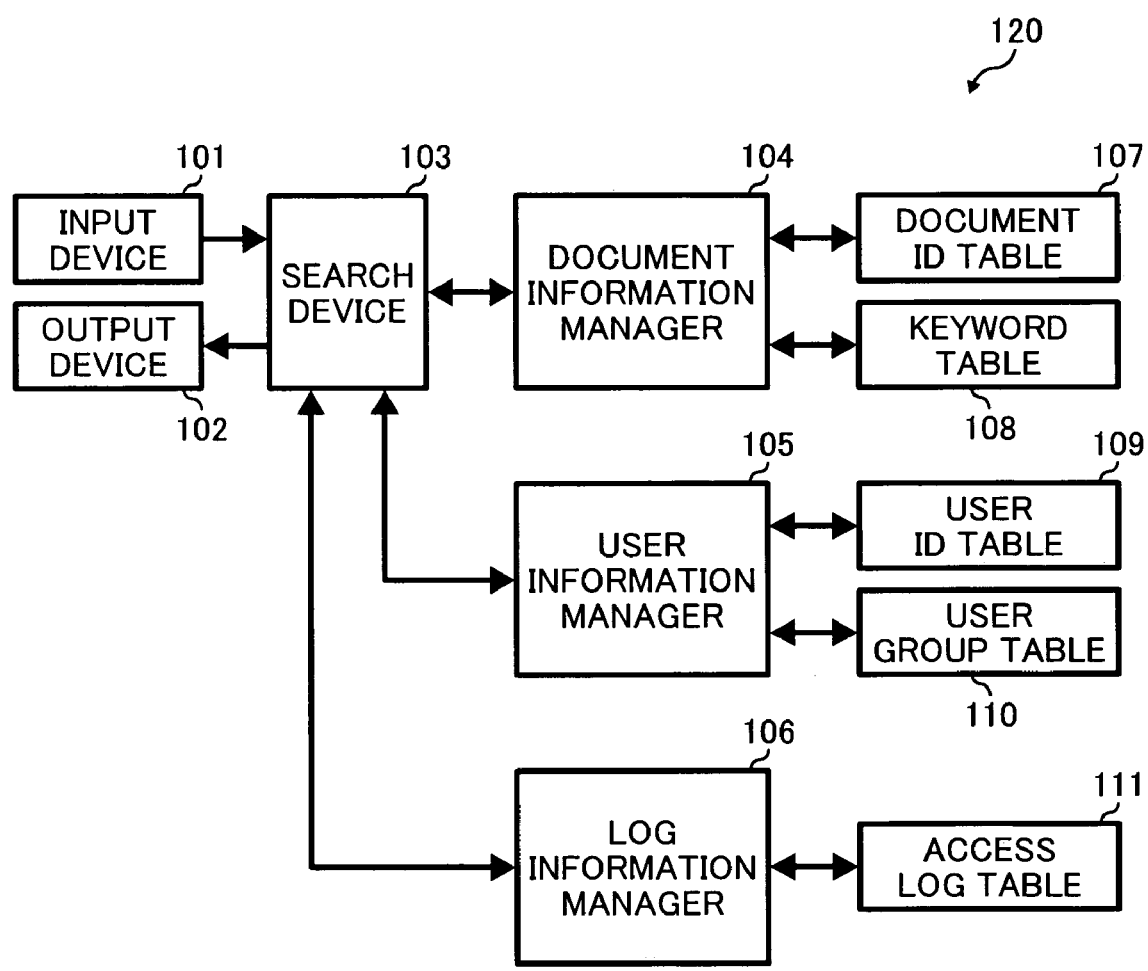
FIG. 3 is a schematic block diagram illustrating the functional structure of a user search apparatus according to an example embodiment of the present invention.

Referring now to FIG. 3, the functional structure of a user search apparatus 120 is explained according to an example embodiment of the present invention. The user search apparatus 120 of FIG. 3 is substantially similar in structure to the user search apparatus 100 of FIG. 1. The differences include the addition of a user group table 110.

The user group table 110 stores user network information, which indicates the relationship among the registered users. The user network information may be used to identify a familiar user who is familiar to the current user. For example, the user network information may be created depending on an organization to which the user belongs, since the users tend to know each other when the users belong to the same organization. In another example, the user network information may be created using a log of email correspondences among the registered users. The user group table 110 may be updated in a timely manner by the user information manager 105.

Figure 4:
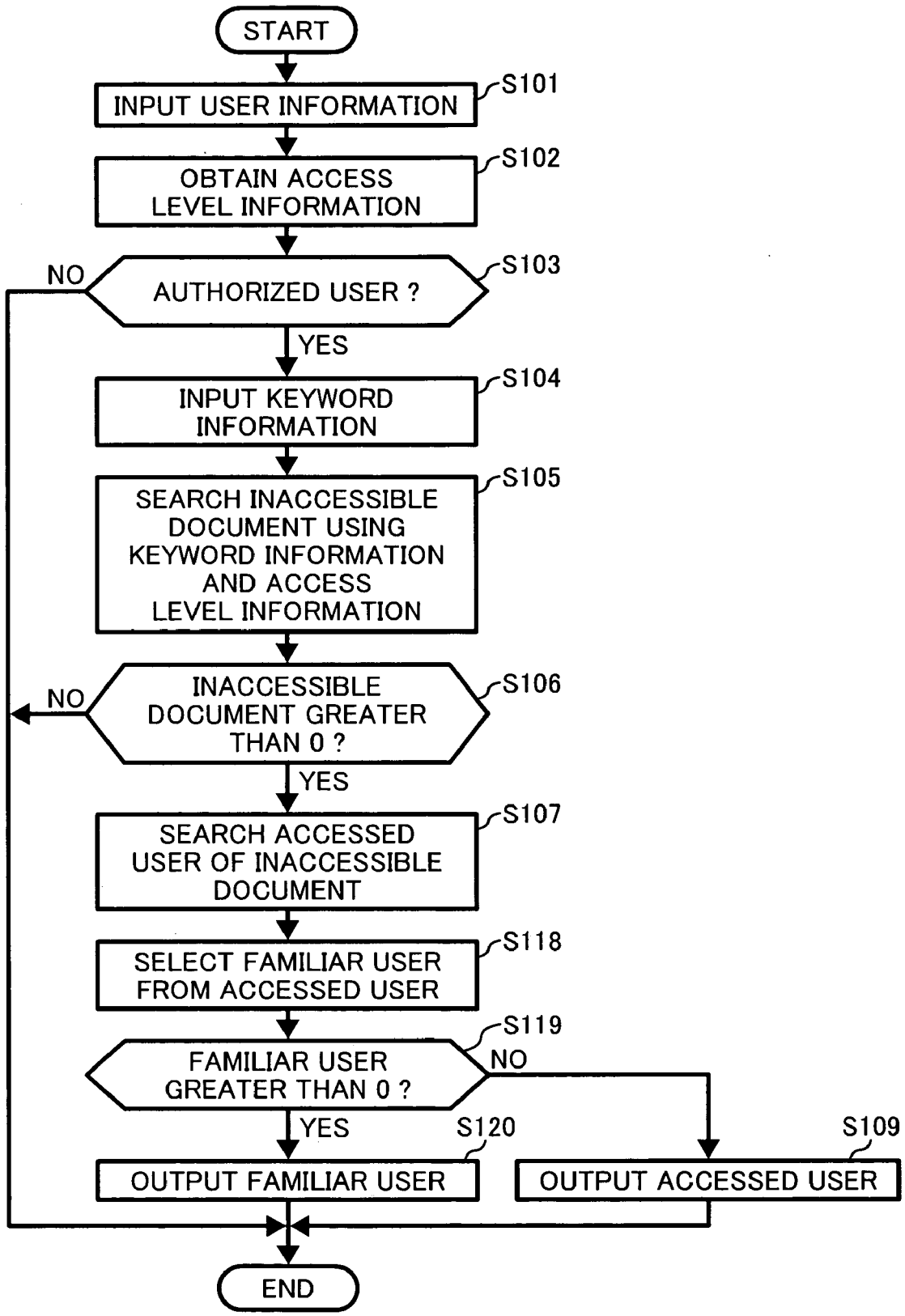
FIG. 4 is a flowchart illustrating operation of searching a familiar previous user who has accessed a matched document that is inaccessible by a current user, according to an example embodiment of the present invention.

Referring now to FIG. 4, an example operation of searching a familiar previous user who has accessed a matched document that is inaccessible from a current user, performed by the user search apparatus 120, is explained. The operation of FIG. 4 is substantially similar to the operation of FIG. 2. The differences include the deletion of Step S108, and the addition of Step S118, S119, and S120.

Step S118 selects one or more familiar users from the previous users obtained at Step S107, using the user group table 110.

Step S119 determines whether the number of familiar users obtained at Step S118 is greater than 0. If the number of familiar users is greater than 0 ("YES" at Step S119), the operation proceeds to Step S120. Otherwise ("NO" at Step S119), the operation proceeds to Step S109.

Step S120 outputs user information regarding one or more familiar previous users obtained at Step S118, and the operation ends. For example, the user information of the familiar user, such as the name of the familiar user, may be output for display at the client apparatus 20.

Once one or more familiar users are identified, the current user may be able to easily obtain information regarding at least one of the inaccessible matched documents, for example, by contacting one or more familiar users.

The operation of FIG. 4 may be performed in various other ways. For example, the steps illustrated in FIG. 4 may not be performed in the order as described above. In another example, Step S103 may not be performed depending on how the system is set. In another example, in addition to outputting the user information of the familiar user, the operation of FIG. 2 may include the step of notifying the previous user that the current user is in need of acquiring information regarding the inaccessible matched document. In another example, as described above referring to FIG. 2, the accessible matched documents may be identified and output for display.

In another example, Step S109 may not be performed depending on how the system is set. In such case, the operation ends without outputting any user information when no familiar user is found at Step S119. In this manner, privacy of each user may be better protected.

Figure 5:
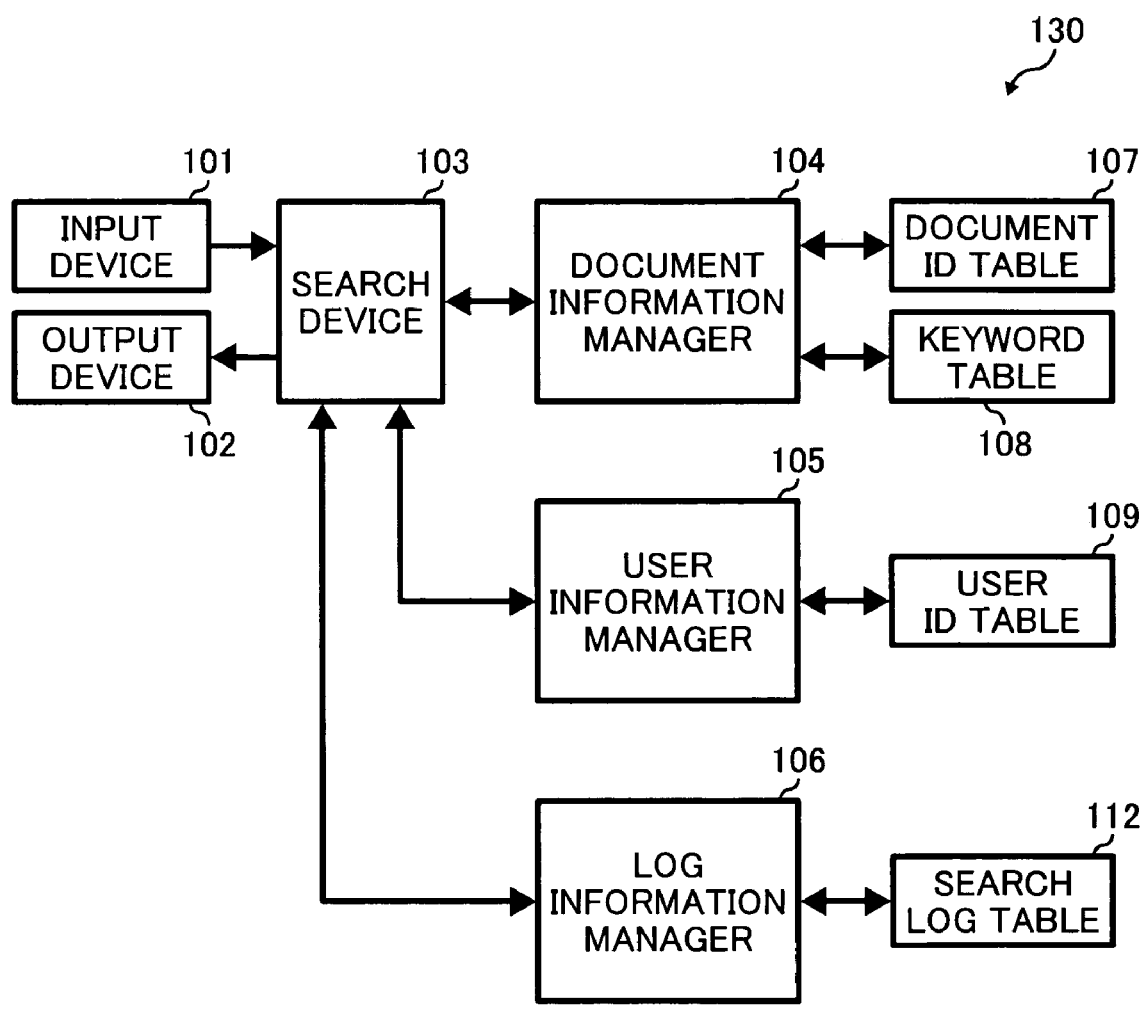
FIG. 5 is a schematic block diagram illustrating the functional structure of a user search apparatus according to an example embodiment of the present invention.

Referring now to FIG. 5, the functional structure of a user search apparatus 130 is explained according to an example embodiment of the present invention. The user search apparatus 130 of FIG. 5 is substantially similar in structure to the user search apparatus 100 of FIG. 1. The differences include the replacement of the access log table 111 with a search log table 112.

The search log table 112 stores, for each of the registered documents, keyword log information indicating keyword information used by one or more previous users. The keyword log information may be stored as a data set including a keyword and the user ID information of the previous user using the keyword, every time that user performs search using the keyword.

Figure 6:
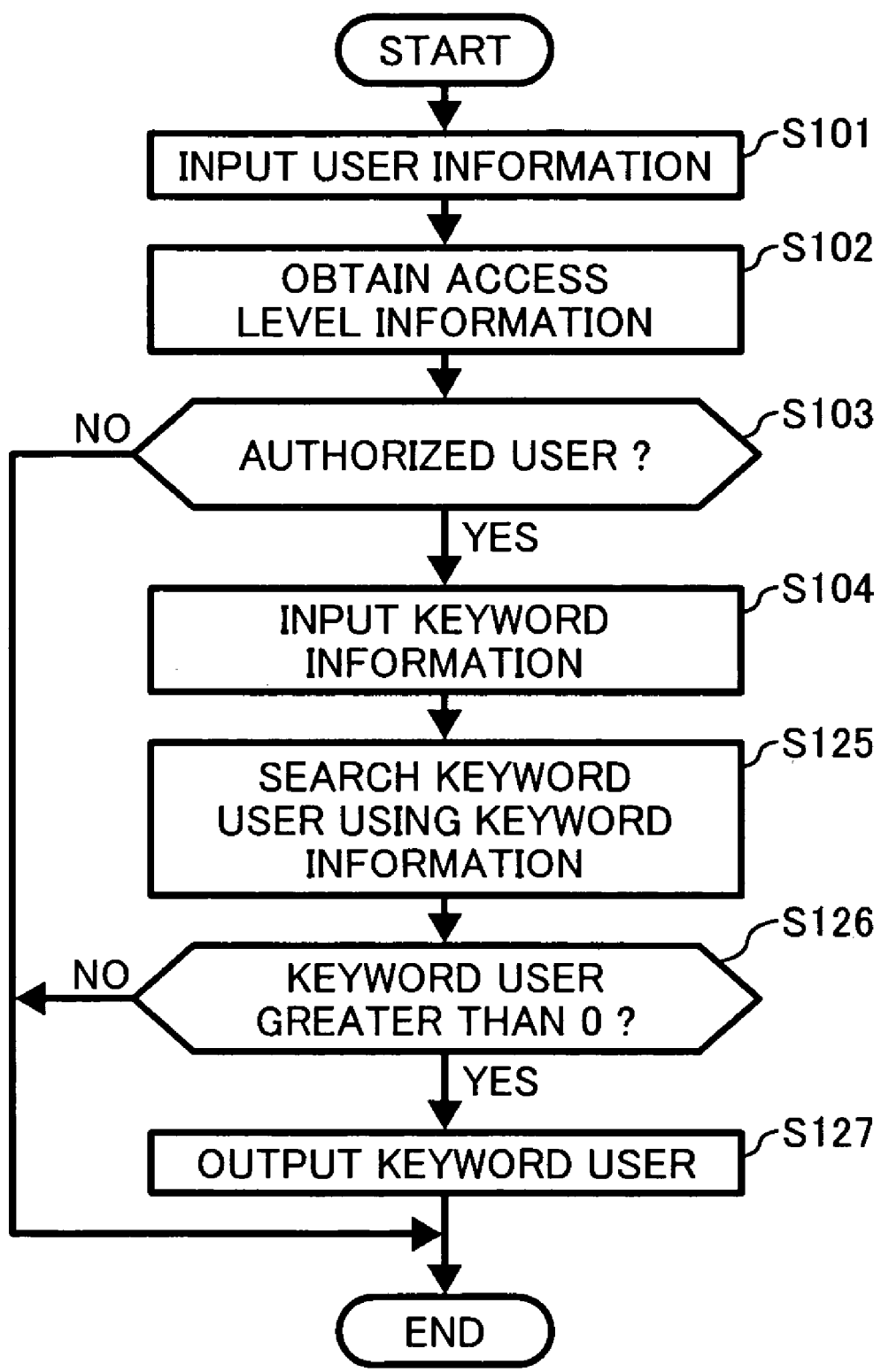
FIG. 6 is a flowchart illustrating operation of searching a previous user who has used keyword information input by a current user, according to an example embodiment of the present invention.

Referring now to FIG. 6, an example operation of searching a previous user who has used keyword information input by a current user, performed by the user search apparatus 130, is explained.

Steps S101 to S104 are performed in a substantially similar manner as described above referring to Steps S101 to S104 of FIG. 2.

Step S125 searches for one or more previous users who have input the keyword information input by the current user, using the keyword log table 112. In this example, the search device 103 obtains user information of the previous users, for example, the names of the previous users.

Step S126 determines whether the number of the previous users obtained at Step S125 is greater than 0. If the number of the previous users is greater than 0 ("YES" at Step S126), the operation proceeds to Step S127. Otherwise ("NO" at Step S126), the operation ends. When ending, the user search apparatus 100 may output an error message using the output device 102 to be displayed by the client apparatus 20.

Step S127 outputs user information regarding one or more previous users obtained at Step S125, and the operation ends. For example, the user information of the previous users, such as the names of the previous users, may be output for display at the client apparatus 20.

The operation of FIG. 6 may be performed in various other ways. For example, Step S103 may not be performed depending on how the system is set.

Once the user information of the previous users is obtained, the current user may be able to obtain information regarding the information search or retrieval using the same keyword information, for example, by contacting one or more previous users.

Figure 7:
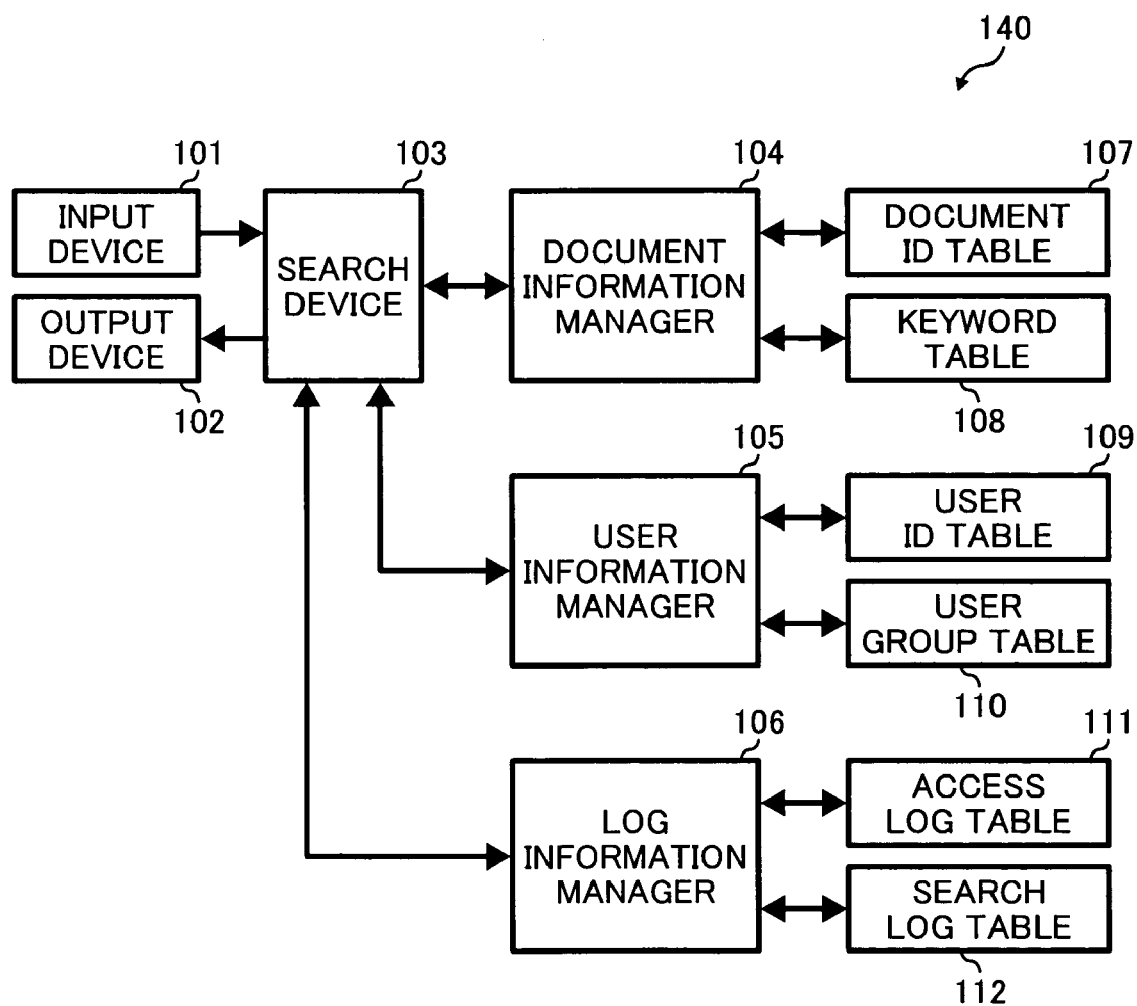
FIG. 7 is a schematic block diagram illustrating the functional structure of a user search apparatus according to an example embodiment of the present invention.

Referring now to FIG. 7, the functional structure of a user search apparatus 140 is explained according to an example embodiment of the present invention. The user search apparatus 140 of FIG. 7 is substantially similar in structure to the user search apparatus 100 of FIG. 1. The differences include the addition of the user group table 110 and the search log table 112.

Figure 8:
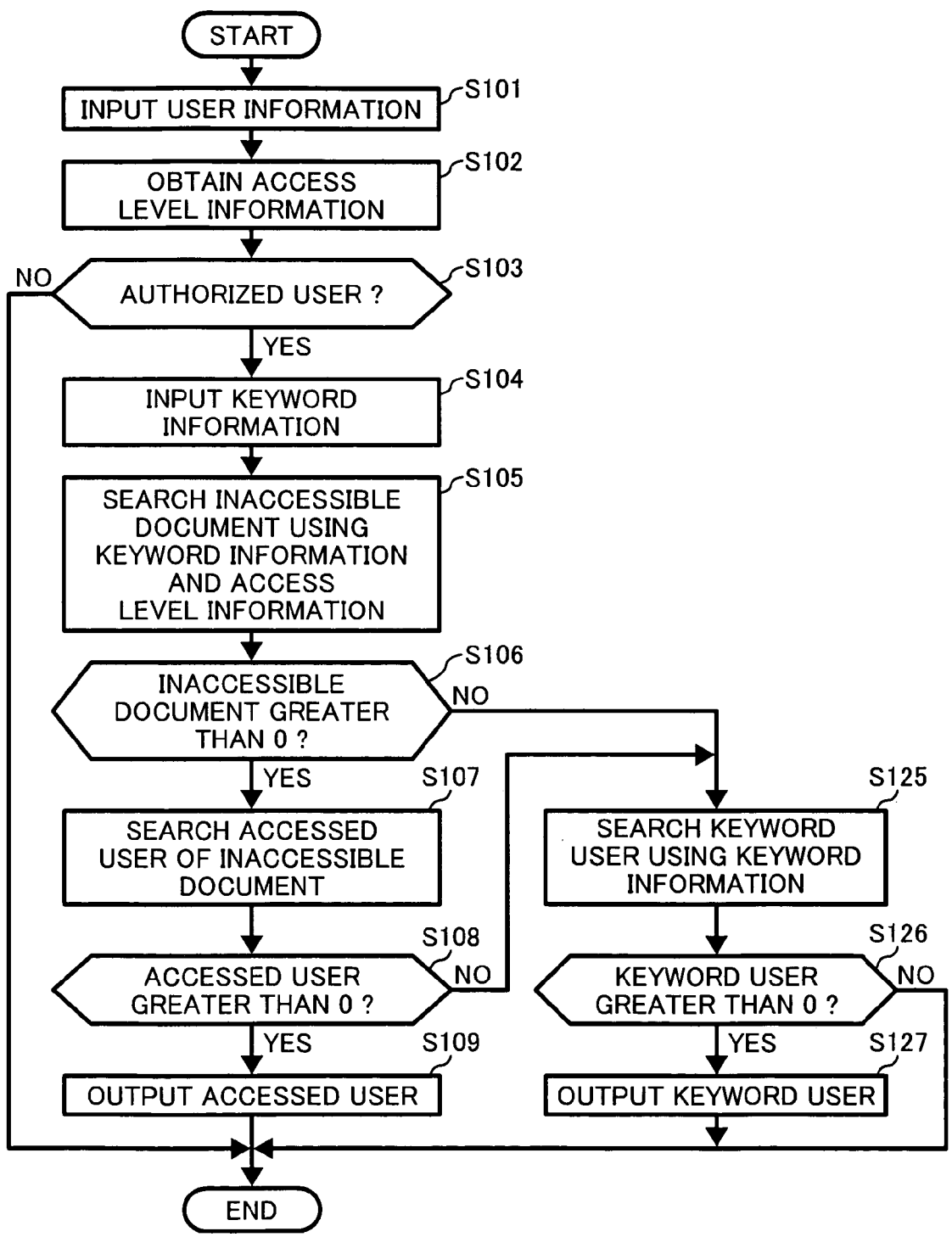
FIG. 8 is a flowchart illustrating operation of searching a previous user who has accessed a matched document that is inaccessible from a current user or a user who has used keyword information input by the current user, according to an example embodiment of the present invention.

Referring now to FIG. 8, an example operation of searching a previous user who has accessed a matched document that is inaccessible from a current user or who has used keyword information input by the current user, performed by the user search apparatus 140, is explained. The operation of FIG. 8 is substantially similar to the operation of FIG. 2. The differences include the addition of Step S125, S126, and S127.

Steps S101 to S105 are performed in a substantially similar manner as described above referring to Steps S101 to S105 of FIG. 2.

If the number of inaccessible matched documents is greater than 0 ("YES" at Step S106), the operation proceeds to Steps S107, S108, and S109 as described above referring to FIG. 2. If the number of inaccessible matched documents is equal to 0 ("NO" at Step S106), the operation proceeds to Steps S125, S126, and S127 to search one or more previous users who have used keyword information input by the current user as described above referring to FIG. 6.

Even when no inaccessible matched document is found, the current user may be able to obtain information regarding the information search or retrieval using the same keyword information, for example, by contacting one or more previous users.

Figure 9:
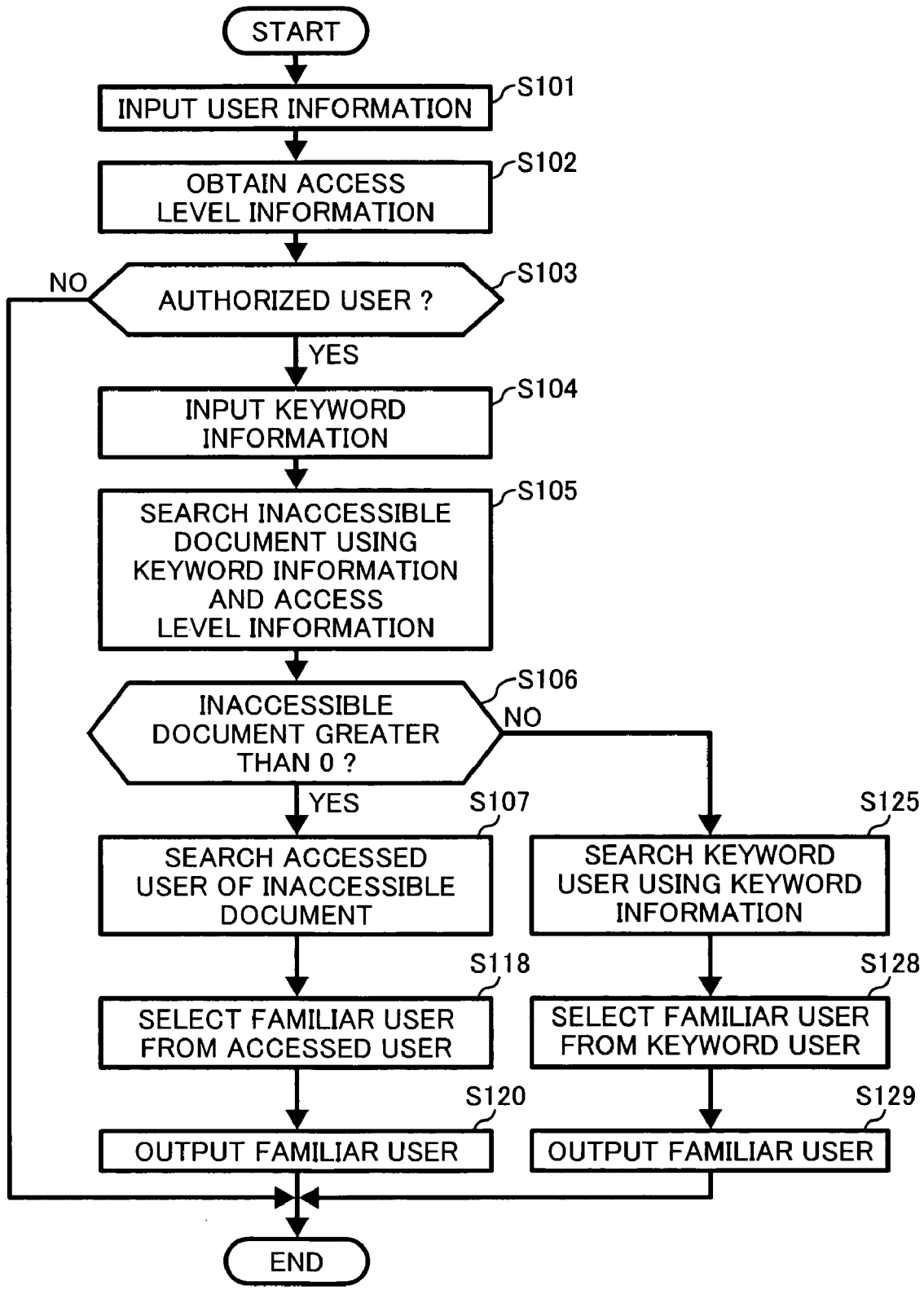
FIG. 9 is a flowchart illustrating operation of searching a familiar previous user who has accessed a matched document that is inaccessible from a current user or a familiar previous user who has used keyword information input by the current user, according to an example embodiment of the present invention.

Referring now to FIG. 9, an example operation of searching a familiar user who has accessed a matched document that is inaccessible from a current user or who has used keyword information input by the current user, performed by the user search apparatus 140, is explained. The operation of FIG. 9 is substantially similar to the operation of FIG. 8. The differences include the replacement of Steps S108, S109, S126, and S127 with Steps S118, S120, S128, and S129.

When one or more previous users who have accessed one or more inaccessible matched documents are obtained at Step S107, the operation proceeds to Step S118 to select one or more familiar users from the previous users. The operation further proceeds to Step S120 to output user information of the familiar users, such as the names of the familiar users.

When one or more previous users who have used keyword information input by the current user are obtained at Step S125, the operation proceeds to Step S128 to select one or more familiar users from the previous users. The operation further proceeds to Step S129 to output user information of the familiar users, such as the names of the familiar users.

As described above referring to FIG. 1, any one of the above-described and other user search apparatuses of the present invention may be implemented by an information processing apparatus, such as the information processing apparatus 10 shown in FIG. 10.

Referring to FIG. 10, the information processing apparatus 10 includes a central processing unit (CPU) 11, a random access memory (RAM) 12, a read only memory (ROM) 13, a hard disk drive (HDD) 14, and an input/output (I/O) device 15, which are connected to one another. The CPU 11 may be implemented by any kind of processor capable of controlling operation of the information processing apparatus 10. The RAM 12 may function as a work area of the CPU 11. The ROM 13 may store various data including, for example, an information processing program of the present invention. The information processing program may be loaded from a storage medium, such as an optical disc, using an optical disc drive. Alternatively, the information processing program may be downloaded from the network via the I/O device 15. The HDD 14 may be implemented by a storage capable of storing a large amount of data, such as one or more databases to be used by the CPU 11. The I/O device 15 allows input or output of data.

The client apparatus 20 includes an input device 21 and an output device 22. As shown in FIG. 10, the input device 21 may be implemented by any kind of device capable of inputting the keyword information, for example, a text input device such as a keyboard, a pointing device such as a mouse, a voice input device such as a microphone, etc. Alternatively, the input device 21 may be implemented by any kind of device capable of inputting the user information, for example, a text input device such as a keyboard, an information reader capable of reading user information out from a medium such as an integrated circuit (IC) card reader, a user recognition device capable of recognizing a user using biological information provided by the user such as a fingerprint recognizing system, etc. In another example, one or more devices may be provided to function as the input device 21, for example, one device functioning as the input device for inputting the keyword information, and the other device functioning as the input device for inputting the user information. The output device 22 may be implemented by a display, such as a liquid crystal display (LCD). Alternatively, the output device 22 may be implemented by any kind of device capable of providing the information obtained by the information processing apparatus 10 to the current user, for example, a printer.

As shown in FIG. 10, the client apparatus 20 may be implemented by a personal computer. Alternatively, the client apparatus 20 may be implemented by other type of apparatus having a user interface, for example, a personal digital assistant (PDA) device or a portable phone.

The information processing apparatus 10 of FIG. 10 may additionally include other devices, for example, such as a scanner or a printer. For example, if the information processing apparatus 10 is provided with the scanner, any kind of data scanned by the scanner may be stored for later use. Alternatively, a communication device, such as a router, may be provided between the information processing apparatus 10 and the client apparatus 20. Further, any one of the input device 21 and the output device 22 may be provided in the information processing apparatus 10. Furthermore, any kind of data may be managed in a substantially similar manner as described above for the case of managing the registered documents, as long as the data can be searched using the keyword information. Furthermore, any kind of information other than the user information may be searched in a substantially similar manner as described above for the case of searching the user information of the previous users.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The invention claimed is:

1. An information search apparatus, comprising:
a processor;
a storage device associated with a document information manager; and
a search device configured to:
  receive identity information corresponding to a current user and keyword information input by the current user;
  retrieve access level information corresponding to the current user indicating a highest confidentiality level of documents that the current user is authorized to access;
  use the processor to identify a set of documents stored in the document information manager matching the keyword information input by the current user, and from that set, at least one document having a confidentiality level higher than that of the current user and that the current user is therefore not authorized to access;
  indicate to the current user that at least one document has been identified that the current user is not authorized to access;
  for at least one of the documents identified that the current user is not authorized to access, use access log information indicating when and by whom each document stored in the document information manager has been previously accessed to identify at least one previous user with a higher confidentiality level who has accessed the at least one document; and
  use keyword log information indicating when and what keywords were used in previous searches executed by the search device to identify at least one previous user who has used the same keyword information input by the current user,
  wherein the search device is configured to select previous users to be familiar to the current user by analyzing user network information that indicates the relationships between registered users of the document information manager.

2. The apparatus of claim 1, further comprising:
an output device configured to output identity information corresponding to the previous users for display to the current user.

3. The apparatus of claim 1, further comprising: a log information manager configured to maintain the access log information corresponding to user activity.

4. The apparatus of claim 1, wherein the search device is further configured to:
notify the at least one previous user who has accessed the at least one document that the current user's search has identified the at least one document previously accessed by the previous user.

5. The apparatus of claim 1, wherein the user network information comprises a log of e-mail correspondences between registered users of the system, and wherein previous users are selected based on the frequency of e-mail correspondence with the current user.

6. The apparatus of claim 1, wherein the user network information comprises organizational information indicating which organizations each registered user of the document information manager belongs to, and wherein previous users are selected based on whether the current user and the previous user belong to a same organization.

7. The apparatus of claim 1, wherein at least one previous user is identified who has both accessed the at least one document and searched for documents using the same keyword information input by the current user.

8. A method for assisting a current user with information search and retrieval, the method comprising:
obtaining identity information corresponding to the current user and keyword information input by the current user;
obtaining access level information of the current user indicating a highest confidentiality level of documents that the current user is authorized to access; and
using a processor to:
  identify a set of documents using document information stored in a memory of a document information manager matching the keyword information, and from that set, at least one document having a confidentiality level higher than that of the current user and that the current user is therefore not authorized to access;
  for at least one of the documents identified that the current user is not authorized to access, use access log information indicating when and by whom each document has been previously accessed to identify at least one previous user with a higher confidentiality level who has accessed the at least one document;
  notify the current user that documents have been identified that the current user is not authorized to access;
  generate a first search result comprising identity information corresponding to the at least one previous user with a higher confidentiality level who has accessed the at least one document;
  use keyword log information indicating when and what keywords were used in at least one previous search to identify at least one previous user who has searched for documents using the same keyword information input by the current user; and
  generate a second search result comprising identity information of the at least one previous user who has searched for documents using the same keyword information input by the current user, wherein the previous users are selected by analyzing user network information that indicates the relationships between registered users of the document information manager.

9. The method of claim 8, further comprising:

generating a third search result comprising document information corresponding to at least one document in the set having a confidentiality level equal to or lower than that of the current user; and outputting at least one of the first search result, the second search result, and the third search result.

10. The method of claim 8, wherein the processor is further used to:

notify the at least one previous user who has accessed the at least one document that the current user's search has identified the at least one document previously accessed by the previous user.

11. The method of claim 8, wherein the user network information comprises a log of e-mail correspondences between registered users of the system, and wherein previous users are selected based on the frequency of e-mail correspondence with the current user.

12. The method of claim 8, wherein at least one previous user is identified who has both accessed the at least one document and searched for documents using the same keyword information input by the current user.

13. A computer readable medium storing computer instructions that, when executed by one or more processors, causes the one or more processors to perform an information search operation comprising:

obtaining identity information corresponding to a current user and keyword information input by the current user;

obtaining access level information of the current user indicating a highest confidentiality level of documents that the current user is authorized to access;

identifying a set of documents stored in a document information manager matching the inputted keyword information, and from that set, at least one document having a confidentiality level higher than that of the current user that the current user is therefore not authorized to access;

notify the current user that documents have been identified that the current user is not authorized to access;

for at least one of the documents identified that the current user is not authorized to access, using access log information indicating when and by whom each document has been previously accessed to identify at least one previous user who has accessed the at least one document;

using keyword log information indicating when and what keywords were used in at least one previous search to identify at least one previous user who has used the same keyword information input by the current user, wherein previous users are selected to be familiar to the current user by analyzing user network information that indicates the relationships between registered users of the document information manager.

14. The computer readable medium of claim 13, wherein at least one previous user is identified who has both accessed the at least one document and searched for documents using the same keyword information input by the current user.

* * * * *